Patented Dec. 28, 1937

2,103,692

UNITED STATES PATENT OFFICE 2,103,692

PROCESS FOR THE PRODUCTION OF SECONDARY AND TERTIARY ALKYL MONOCHLORIDES

Wacław Junosza Piotrowski and Józef Winkler, Drohobycz, Poland

No Drawing. Application August 31, 1931, Serial No. 560,520. In Germany October 15, 1930

11 Claims. (Cl. 260—166)

The development of the cracking processes has resulted in the fact that large quantities of gaseous and liquid olefines are available for the industry. Owing to their reactive capabilities these olefines form an admirable starting material for chemical synthesis. Alkyl chlorides, which can be obtained by adding hydrogen halides to the olefine double bond, form the starting point of very many syntheses in organic chemistry. It is known that, of the hydrogen halides, hydrogen iodide is the most easily added. The addition of hydrogen bromide takes place less readily and hydrogen chloride can only be added with great difficulty. This fact is confirmed in the experiments carried out by Erlenmeyer, Annalen 139, page 228 (1846), Butlerow, Annalen 145, page 274 (1868), Markownikow, Annalen 153, page 256 (1869), Berl, Ber. II, page 660 (1869) and Saitzeff, Annalen 179, page 296 (1875). The above investigators carried out their operations by causing the olefines to react with aqueous concentrated hydrochloride acid. In the later work carried out in connection with the addition of hydrogen chloride to olefines the latter were treated with concentrated hydrochloric acid, zinc chloride being added to the hydrochloric acid by some investigators. (Wagner and Saitzeff, Annalen 179, page 321, 1875, Kondakoff, Annalen 25, page 354 (1893).

The German Patent No. 279,955 of the Bad. Anilin und Sodafabrik, according to which the fraction of cracked benzines, boiling up to 45° C., is treated with concentrated HCl, whereby tertiary amyl chloride is said to be formed, is based on these experiments.

The olefines themselves, according to all the hitherto known publications, were caused to react with HCl in that state of aggregation, in which they exist under normal conditions of pressure and temperature, i. e. ethylene and propylene in the gaseous state (nothing has hitherto been published concerning the addition of HCl to butylene) and amylenes and higher homologues in the liquid state. According to the described processes the yield of alkyl chlorides was so small that their use in industry could not be contemplated. Within recent years attempts have been made by Berl and Ritter, (Berl, Ber. 57, page 95, 1924) to convert ethylene into ethyl chloride with the aid of gaseous HCl in the presence of catalysts, such as $AlCl_3$, $BiCl_3$, $FeCl_3$, $SbCl_3$ and $VCl_3$, and by J. P. Wibaut, (Zeit. f Electrochemie 35, page 602 (1929)) to convert ethylene and propylene by similar methods into ethyl chloride and propyl chloride respectively. In this way, by employing pure olefines, they succeeded in obtaining yields up to 35% of theory. As carriers for the catalysts inert materials, such as glass and asbestos, were employed.

The work done in this field hitherto thus did not result in such yields of alkyl chlorides as would justify contemplating their application in industry. The comparatively low yields were probably due to the fact that the catalysts and catalyst carriers were not sufficiently active and also that the amylenes and higher homologues in the liquid phase react very sluggishly with HCl. Experiments were therefore carried out in this direction and resulted in the present invention. It has been found to be advantageous to cause also those olefines, which are liquid at ordinary temperatures, to react in the vapor phase with HCl. Highly porous substances, such as active carbon, silica gel, etc., were found to be particularly suitable as carriers. These substances already possess in themselves a strong catalytic action and give rise in one operation, even without further additions, to more than 30% of the theoretical yield of alkyl chlorides. If chlorides of the di- and polyvalent metals, such as $ZnCl_2$, $CdCl_2$, $BiCl_3$, $SnCl_4$, $TiCl_4$, $UCl_4$, $WCl_4$, $VCl_4$, $MoCl_5$, $SbCl_5$ etc. are deposited in a finely divided condition on the above highly active carriers, theoretical yields are obtained. In place of the chlorides, use may be made of any other salts of these metals, for example nitrates or sulphates, which, during the reaction, are converted in the presence of HCl into the active chlorides. The high activity of the catalysts employed also enables olefines to be treated in a diluted condition, i. e. admixed with non-olefinic compounds, for example with aliphatic, aromatic, naphthenic and other hydrocarbons boiling at the same temperature. This constitutes a particular advantage, since pure olefinic gases and liquids are not formed in any of the known technical processes. In this way the gaseous and liquid reaction products of the cracking, distilling and tar-distillation processes, etc. form a suitable starting material for the production of alkyl chlorides.

Examples

1.—100 cubic metres of waste gas from a cracking distillation process containing 12% by volume of unsaturated hydrocarbons, of which 2% are ethylene, 8% propylene and 2% butylene, are passed together with the theoretical quantity of thoroughly dried gaseous hydrogen chloride over active carbon, which has been impregnated with 20% anhydrous $SnCl_4$. This catalyst is disposed in an earthenware tube heated to about 150° C. The gaseous reaction mixture is washed with water and soda solution and the resulting chlorides are separated by condensation or absorption by active carbon.

The total yield of chlorides amounts to 38.5 kgms., from which there are obtained by suitable fractionating: 5 kgms. of $C_2H_5Cl$, 26.2 kgms. of $C_3H_7Cl$ and 7.3 kgms. of $C_4H_9Cl$ corresponding to a 91% yield of chlorides.

2.—100 kgms. of a fraction of a cracked benzine, boiling between 20° and 40° C. (containing 65% of pentanes and 35% of amylenes) are passed in vapor form, mixed with the calculated quantity of HCl gas, over silica gel, which has been previously saturated with 10% of a mixture of anhydrous $ZnCl_2$ and $TiCl_4$. The catalyst is disposed in two copper tubes silvered inside, the first of which is maintained at about 150° C. and the second at about 80° C. The former temperature favours the formation of secondary chlorides and the latter temperature the formation of tertiary chlorides. The vapor mixture is washed as in Example 1 with water and soda solution and is then fractionally condensed. In this way a separation of the non-reactive pentanes, boiling up to 40° C., and the secondary and tertiary amyl chlorides, boiling between 85° and 115° C., is effected. The yield of chlorides amounts to 48 kgms.

3.—100 kgms. of a fraction of benzine from the distillation of brown coal, boiling between 40° and 80° C. and containing 70% of hexanes and 30% of hexylenes, are passed in the manner described in Example 2 over an active carbon impregnated with 15% $VCl_4$, 43 kgms. of secondary and tertiary hexyl chlorides of boiling point 110° to 150° C. are finally obtained.

What we claim is:

1. A process for the production of secondary and tertiary alkyl monochlorides from normally liquid olefines which comprises vaporizing said olefines and passing the vapor mixture with hydrogen chloride over a polyvalent metal halide catalyst deposited upon substances of high surface activity selected from the group consisting of silica gel and active carbon.

2. A process for the production of secondary and tertiary alkyl monochlorides from normally liquid olefines in admixture with other hydrocarbons which comprises vaporizing said olefines and passing the vapor mixture with hydrogen chloride over a polyvalent metal halide catalyst deposited upon substances of high surface activity selected from the group consisting of silica gel and active carbon.

3. A process as claimed in claim 1, in which the metal halide catalyst consists of zinc chloride.

4. A process as claimed in claim 1, in which the metal halide catalyst consists of titanium chloride.

5. A process as claimed in claim 1, in which the metal halide catalyst consists of tin chloride.

6. A process as claimed in claim 1, in which the chlorides are produced during the reaction by converting other metal salts into chlorides by the aid of HCl.

7. A process as claimed in claim 2, in which the chlorides are produced during the reaction by converting other metal salts into chlorides by the aid of HCl.

8. A process as claimed in claim 1, wherein dry, gaseous hydrogen chloride is employed.

9. A process as claimed in claim 2, wherein dry, gaseous hydrogen chloride is employed.

10. A process as claimed in claim 1, wherein olefine mixtures, from which secondary and tertiary chlorides can be formed, are conveyed at at least two temperatures differing from each other by at least 40 degrees centigrade over the catalysts, the olefine vapors first passing over the catalyst which is heated to the higher temperature.

11. A process as claimed in claim 2, wherein olefine mixtures, from which secondary and tertiary chlorides can be formed, are conveyed at at least two temperatures differing from each other for at least two temperatures differing from each other for at least 40 degrees centigrade over the catalysts, the olefine vapors first passing over the catalyst which is heated to the higher temperature.

WACŁAW JUNOSZA PIOTROWSKI.
JÓZEF WINKLER.